Patented May 24, 1949

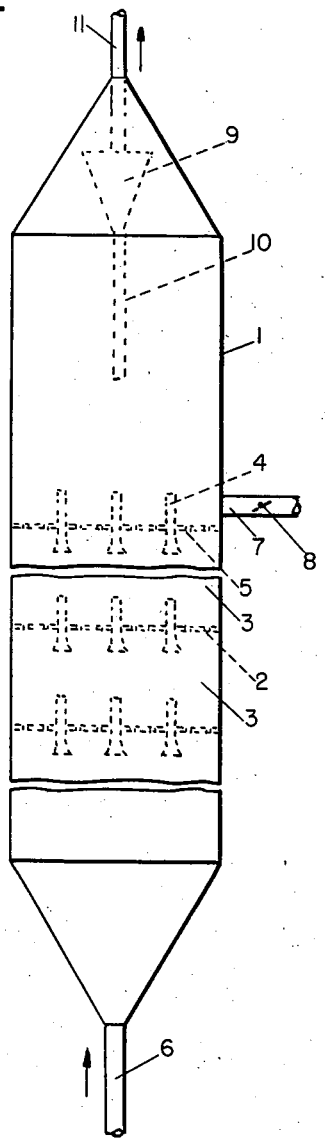
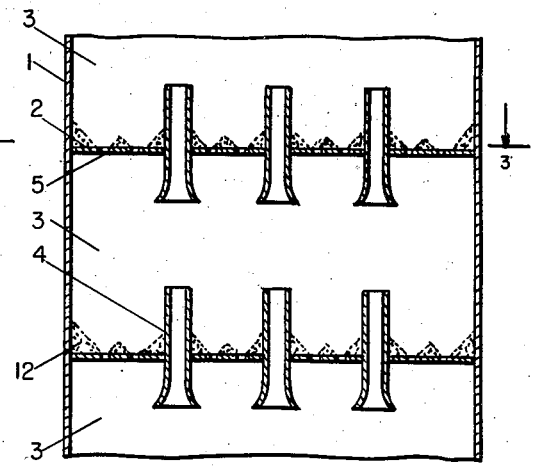
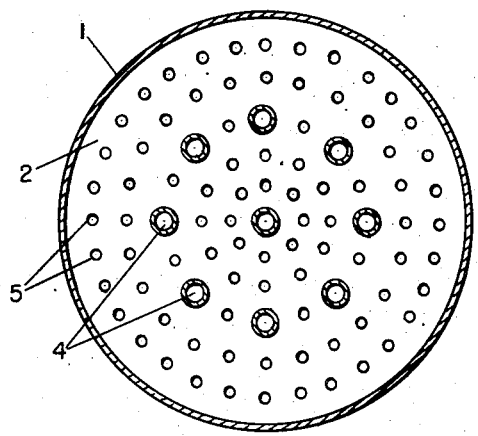

2,471,085

UNITED STATES PATENT OFFICE 2,471,085

FLUID CATALYST PROCESS FOR THE CONVERSION OF HYDROCARBONS

Marion James Wilcox, Harvey, Ill., and Ralph Elden Hall, East Chicago, Ind., assignors to Sinclair Refining Company, New York, N. Y., a corporation of Maine Application June 28, 1947, Serial No. 757,908

3 Claims. (Cl. 196—52)

1

This invention relates to the pyrolytic conversion of hydrocarbons and, more particularly, to pyrolytic conversion processes involving the use of a finely divided catalyst. The invention provides an improvement process of increased catalytic efficiency and also a novel apparatus particularly adapted to the carrying out of the process.

The invention is especially applicable to conversion processes of the general type wherein a finely divided catalyst is brought into intimate contact with the vaporized hydrocarbons to be converted in a reaction zone, spent catalyst is separated from the oil vapors, the separated catalyst stripped of oil by contact with a gaseous stripping medium, the catalyst regenerated by decarbonization, and the regenerated catalyst returned to the reaction zone for contact with further hydrocarbon vapors to be converted.

Operations of the type described are commonly designated fluid catalyst processes. In conventional operation, the spent catalyst from the reaction zone is stripped by contact with steam in the stripping zone, the carbon deposited on the catalyst particles is burned off by contact with air in the regenerating zone, and the regenerated catalyst in fluid suspension is returned to the reaction zone.

An important consideration in operations of this type, from a practical aspect, is the efficient utilization of the catalyst. For maximum efficiency, it is necessary that all of the catalyst be utilized to an equal extent in the reaction zone and passed to the regenerator and that in the regenerator all of the catalyst be uniformly regenerated and returned to the reaction zone.

In operations of this type, the catalyst is usually maintained throughout the operation in a fluidized condition. However, the catalyst is normally not of uniform density throughout the various stages of the operation. In both the reaction zone and the regenerating zone and also in the stripping zone there is maintained a so-called "high density" or "dense phase" body of catalyst of considerable depth through which the gases and vapors pass and above which the catalyst in relatively low concentration is suspended in the ascending gases or vapors.

In conventional operation, these dense phase bodies of catalyst are in a continuously turbulent state. Because of this condition, there is a mixing of the catalyst resulting in a heterogeneous mass of catalyst in the beds. While this is beneficial from a temperature-control viewpoint, an advantage of fluidized technique in catalytic conversion, there is an inherent disadvantage in that the fresh incoming catalyst, partially spent catalyst and spent catalyst, in the case of the reactor, become intermixed in the catalyst bed. When catalyst is withdrawn from the bed for regenera-

2 tion, this heterogeneous mixture is taken off and not a truly spent catalyst. Also due to the intermixing of the fresh and spent catalyst, the average effective activity of the catalyst in the bed is less than if spent catalyst were not also present.

Similarly, in the stripper and in the regenerator a more complete stripping and burning off of the oil and carbonaceous material from the catalyst, respectively, would be possible if it were not for the mixing of the stripped and unstripped and regenerated and partially regenerated catalyst in the respective zones.

Further, the catalyst-vapor contacts in the reactor and the stripper and the contact between the catalyst and regenerating gases in the regenerator are not as intimate and uniform as desirable. In the turbulent beds of catalyst there is a tendency for large globules of the vapors or gases to pass upwardly through the catalyst bed without coming into intimate contact with the catalyst.

In our copending applications Ser. Nos. 745,036, 745,037, and 745,038, filed April 30, 1947, we have described and claimed an improved method of avoiding, to a major extent at least, objectionable intermixing of the catalyst in different stages of activity and for effecting more uniform contact between the catalyst and the vapors or gases, while maintaining the fluidized principle of operation. In the process and apparatus therein described, this is accomplished by interrupting the relatively dense phase of the bed of catalyst in the respective contact chambers by alternate zones of less catalyst density in which the catalyst, in relatively low concentration, is entrained in one or more upwardly rising restricted streams of the vapors or gases, herein referred to as the gaseous medium, of increased velocity and permitting a portion of the catalyst to gravitate from a higher to a lower zone through annular spaces surrounding the upwardly rising gaseous streams.

In the operations therein described, the catalyst in suspension in the gaseous medium may be introduced into the lower end of the contact chamber and passed upwardly therethrough, the catalyst and gaseous medium being separately withdrawn from the upper portion of the chamber, or the catalyst may be introduced into the upper end of the contact chamber and the gaseous medium introduced into the lower end thereof and passed upwardly through the chamber, generally countercurrent to the downwardly gravitating catalyst.

The respective contact chambers therein described, are divided into a series of zones or compartments by chimney trays, adjacent compartments being connected by the chimneys which are flared or bell-shaped at their lower ends and extend vertically through uniformly disposed openings in the trays of such size as to provide an annular opening surrounding the respective chimneys. In operation, the catalyst is carried upwardly from one compartment of the contact chamber to the next higher compartment through the chimneys in suspension in the gaseous medium and tends to drop out of suspension, after passing through the chimneys forming a relatively dense phase body of catalyst on the respective trays. From these dense phase bodies, catalyst flows downwardly through the annular spaces surrounding the chimneys, the downward flowing catalyst being caught up by the ascending vapors and again carried upwardly through the chimneys into the next higher compartment.

The present invention provides an improved method of operation, and improved apparatus, somewhat similar to those disclosed in said copending applications, but having the further advantage of increased circulation of the catalyst on the respective trays intermediate the chimneys and the surrounding annular spaces, thus assuring better utilization of the catalyst in the system. A further advantage derived from the present invention is reduced erosion, a distributing of the erosion more evenly over the entire tray, instead of having it concentrated on the chimneys and immediately surrounding the chimneys and further reduced cost in construction and maintenance of the contact chamber.

We have found that the foregoing advantages are attained by more uniformly distributing the openings in the trays, through which the catalyst passes downwardly, over the entire area of the tray, instead of providing annular spaces surrounding the chimneys for the downward flow of the catalyst. In accordance therewith, we provide, in place of the trays described in our copending applications, a tray having one or more chimneys, of the type described, extending therethrough, the respective chimneys being supported directly by the tray and sealed to the tray as by welding, the tray otherwise being uniformly perforated throughout.

The invention will be further described and illustrated with reference to the accompanying drawing, of which:

Figure 1 represents a vertical sectional view of a contact chamber, adapted for use as either a regenerator, a reactor or a stripper;

Figure 2 is an enlarged vertical section showing the trays in greater detail; and Figure 3 represents a horizontal sectional view along the lines 3—3 of Figure 2.

The apparatus indicated in the drawing by the reference numeral 1 represents a generally cylindrical contact chamber provided internally with a plurality of perforated trays 2 extending entirely across the chamber and dividing the lower and intermediate portions of the chamber into a plurality of zones 3. The trays 2 are provided with a plurality of uniformly spaced chimney 4, flared at their lower ends, extending through the trays and fastened thereto by welding or otherwise directly supported by the trays. Intermediate the chimneys, the trays are uniformly perforated as indicated at 5.

When operating as a regenerator, for instance, the spent catalyst, suspended in regenerating air, is passed upwardly into the lower portion of the chamber through conduit 6, the catalyst being carried upwardly through the chimneys 4 of the lowermost tray and forming a dense phase body of catalyst on the tray. A portion of the catalyst is carried by the gaseous medium upwardly through the chimneys of the next higher tray and so on, forming a dense phase body of catalyst on each of the trays. A portion of the body of catalyst on the trays will pass downwardly through the perforations 5 into the zone below where it is caught up in suspension in the gaseous medium and again carried upwardly into the next higher zone.

Regenerated catalyst is withdrawn from an upper zone, or zones, through conduit 7 provided with a damper, or valve 8, for controlling the rate of flow of the catalyst therethrough and, from thence, is passed to the reactor in suspension in the charge oil. Products of combustion pass from the upper end of the chamber through a separator, diagrammatically indicated at 9, for the separation of suspended catalyst, the separated catalyst being returned to the chamber through downcomer 10 and the products of combustion being withdrawn through conduit 11 to a precipitator, or stack, not shown.

Where the chamber is used as a reactor, the catalyst and hydrocarbon vapors may be introduced into the lower end of the chamber through line 6, spent catalyst withdrawn from the upper zone through line 7 and hydrocarbon vapors, products of the conversion, withdrawn through line 11 to fractionating apparatus, not shown. Alternatively, freshly regenerated catalyst may be introduced into the upper zone of the chamber through line 7 and passed downwardly therethrough, generally countercurrent to hydrocarbon vapors introduced to the chamber through line 6, suitable means, not shown, being provided at the lower end of the chamber for the withdrawal of spent catalyst.

Due to the angle of repose of the catalyst, there will be a plurality of small zones on the respective trays intermediate the perforations and indicated on the drawing by the reference numeral 12, where the circulation of catalyst will be more or less sluggish. However, in the apparatus shown, these zones are relatively small by reason of the distribution of the openings through the tray and, therefore, the "hold-up" of catalyst is materially reduced.

In operation, a relatively dense phase fluidized body of catalyst, say, of a density of about 40 to 60 pounds per cubic foot, will be formed on the respective trays for a depth not exceeding the height of the chimney above the tray. In the zones of the reactor between the top of a lower chimney and the lower end of the next higher chimney, there will be maintained a body of somewhat lower catalytic density, say, 25 to 35 pounds per cubic foot due to the upward passage of the vapors therethrough. The concentration of catalyst in the streams of vapor, or gases, passing upwardly through the chimneys will be still less, say, 2 to 12 pounds per cubic foot. Thus, the catalyst will be repeatedly dispersed in the vapors, in the respective zones of the reactor affording thorough and uniform contact between the catalyst and the vapors. Further, the catalyst will continually pass downwardly through the perforations in the respective trays from a higher to a lower zone. Such intermixing as occurs is primarily of catalyst of relatively similar catalytic activity, objectionable top-to-bottom mixing of the catalyst being minimized.

The summation of the depths of the bodies of catalyst between the tops of lower chimneys and the bottoms of the next higher chimneys may, with advantage, be about that of the customary depths of the catalyst bed, in conventional operation. However, due to more thorough contact between the catalyst and the hydrocarbon vapors, somewhat less depth will generally be found effective to accomplish comparable results.

Also, the gaseous media in passing upwardly through the chamber is repeatedly passed through one or more relatively small restricted streams, which may be uniformly spaced throughout the transverse area of the chamber, thus avoiding the channelling of vapors through the catalyst bed without adequate contact with the catalyst.

By so coordinating the rates of feed to the chamber and the dimensions of the various elements of the chamber and velocities of flow, the dominant flow of the catalyst through the chamber may be either upwardly or downwardly.

The chimney trays should be so designed and proportioned with respect to the transverse dimensions of the chamber and the amount of gaseous medium to be passed upwardly through the chamber that the gaseous medium passes upwardly at a superficial velocity within the range of 0.3 to 1.5 feet per second in the enlarged zones between the trays and at superficial velocities through the chimneys within the range of 3.5 to 7 feet per second. By selection of the proper chimney dimensions, lengths, bottom bell diameters and the summation of the areas of the perforations in the trays, it is possible to obtain ratios of total chimney areas to total tray areas of 1:3.5 to 1:15 to obtain the desired velocity range noted above.

The chimney height may vary from, say, 12 to 18 inches, the height of the chimney above the tray being from 9 to 12 inches. The selection of the total perforation areas and the bell bottom diameters will depend upon the desired upflow rate of the catalyst from zone to zone. The distance between the trays will depend primarily upon the number of zones desired and the total bed height of catalyst to be maintained in the chamber.

Within the range of conditions noted above, the catalyst loading of the upflow vapors will vary from 2.5 to 12 pounds of catalysts per cubic foot of gaseous medium and the downflow of the catalyst through the perforations will be within the range of 0.25 to 0.50 ton per square foot of perforation area per minute. By proper proportioning of the downflow rate and the upflow rate of the catalyst through the respective trays, the direction of dominant flow of the catalyst through the chamber may be either upwardly or downwardly, as previously noted.

Usually, it is desirable to employ at least three trays in a chamber to be used as a reactor or as a regenerator. More than three trays are usually desirable, say, 3 to 10 trays. Usually, at least three trays are desired in a chamber to be used as a stripper.

The catalyst employed may be of the type conventionally used in fluid catalyst processes, for instance, a silica-alumina type catalyst in finely divided or powdered form. The reaction conditions may likewise be those conventionally used in operations of this type, and, as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied largely by the hot catalyst passing into the charge oil from the regenerator.

It will be understood that the present invention is not restricted to the particular embodiment thereof herein described but is applicable to various modifications of fluid catalyst processes.

We claim:

1. In the fluid catalyst process for the conversion of hydrocarbons wherein a gaseous medium is passed upwardly in contact with a dense phase, fluidized body of catalyst in a contact chamber, the steps of maintaining in the contact chamber a plurality of dense phase, fluidized bodies of the catalyst interposed between alternate vertically spaced zones of lower catalyst density in which the catalyst in relatively low concentration is entrained in an upwardly rising gaseous medium, passing the suspension upwardly through relatively small, restricted passageways extending from below the lower end to substantially above the lower end of the respective dense phase bodies of catalyst, causing catalyst from the respective dense phase bodies to flow downwardly into the next lower zone in fine streams uniformly spaced over the transverse area of the contact chamber and withdrawing the gaseous medium from an upper portion of the chamber.

2. In the fluid catalyst process for the conversion of hydrocarbons wherein a gaseous medium is passed upwardly in contact with a dense phase, fluidized body of catalyst in a contact chamber, the steps of maintaining in the contact chamber a plurality of dense phase, fluidized bodies of the catalyst interposed between alternate vertically spaced zones of lower catalyst density in which the catalyst in relatively low concentration is entrained in an upwardly rising gaseous medium, passing the suspension upwardly through relatively small, restricted passageways extending through the respective dense phase bodies of catalyst, causing catalyst from the respective dense phase bodies to flow downwardly into the next lower zone in fine streams uniformly spaced over the transverse area of the contact chamber and withdrawing the gaseous medium from an upper portion of the chamber.

3. The process of claim 1 wherein the suspension is passed upwardly through a plurality of relatively small restricted passageways extending substantially vertically through the respective dense phase bodies of catalyst.

MARION JAMES WILCOX.
RALPH ELDEN HALL.

REFERENCES CITED

The following references are of record in the file of this patent:

UNITED STATES PATENTS

| Number | Name | Date |
|---|---|---|
| 1,380,067 | Koch et al. | May 31, 1921 |
| 2,367,281 | Johnson | Jan. 16, 1945 |
| 2,444,998 | Hemminger | July 13, 1948 |